(12) United States Patent
So et al.

(10) Patent No.: US 10,406,868 B2
(45) Date of Patent: Sep. 10, 2019

(54) PNEUMATIC TIRE COMPRISING SENSOR PATCH AND METHOD FOR MANUFACTURING THE SAME

(71) Applicant: HANKOOK TIRE CO., LTD., Seoul (KR)

(72) Inventors: Soon-Hong So, Daejeon (KR); Jeong Heon Kim, Daejeon (KR)

(73) Assignee: HANKOOK TIRE CO., LTD., Seoul (KR)

( * ) Notice: Subject to any disclaimer, the term of this patent is extended or adjusted under 35 U.S.C. 154(b) by 486 days.

(21) Appl. No.: 15/191,045

(22) Filed: Jun. 23, 2016

(65) Prior Publication Data

US 2017/0057304 A1 Mar. 2, 2017

(30) Foreign Application Priority Data

Aug. 24, 2015 (KR) .......................... 10-2015-0118988

(51) Int. Cl.
*B60C 19/00* (2006.01)
*B29D 30/00* (2006.01)
*B60C 23/04* (2006.01)

(52) U.S. Cl.
CPC .......... *B60C 19/00* (2013.01); *B29D 30/0061* (2013.01); *B60C 23/0493* (2013.01);
(Continued)

(58) Field of Classification Search
CPC ..... B60C 25/005; B60C 25/00; B60C 23/105; B60C 23/10; B60C 23/085; B60C 23/08;
(Continued)

(56) References Cited

U.S. PATENT DOCUMENTS 6,885,291 B1 * 4/2005 Pollack ............... B60C 23/0433
116/34 R
6,899,153 B1 5/2005 Pollack et al.
(Continued)

FOREIGN PATENT DOCUMENTS

CN 104044412 A 9/2014
DE 202005005144 U1 6/2005
(Continued)

OTHER PUBLICATIONS

Office Action issued in Chinese Patent Application No. 201610685456.5 dated Mar. 16, 2018.
(Continued)

*Primary Examiner* — Robert C Dye
*Assistant Examiner* — Nicholas R Krasnow
(74) *Attorney, Agent, or Firm* — Marshall, Gerstein & Borun LLP

(57) ABSTRACT

A tire equipped with a sensor patch includes a sensor module and a sensor patch. The sensor patch is formed integrally with the inner liner of the tire by being vulcanized into the inner circumferential surface, and an accommodation space is formed in a region so that the sensor module can be fixed therein. A sensor patch is integrated with the inner liner without damaging the inner liner, and thus the sensor patch can be strongly bound to the tire. Furthermore, since the sensor patch is formed to have a thickness smaller than the thickness of the inner liner, when the sensor patch is vulcanized into the inner liner, the pressure of the bladder being exerted locally non-uniformly on the inner liner can be prevented.

9 Claims, 13 Drawing Sheets

(52) U.S. Cl.
CPC .............. *B29D 2030/0072* (2013.01); *B29D 2030/0077* (2013.01); *B29D 2030/0083* (2013.01); *B60C 2019/004* (2013.01)

(58) Field of Classification Search
CPC ... B60C 23/068; B60C 23/067; B60C 23/066; B60C 23/061; B60C 23/06; B60C 23/0493; B60C 23/0491; B60C 23/0489; B60C 23/0488; B60C 23/0486; B60C 23/0484; B60C 23/0452; B60C 23/0447; B60C 23/0444; B60C 23/04; B60C 23/002; B60C 23/00
USPC ...................................................... 152/152.1
See application file for complete search history.

(56) References Cited

U.S. PATENT DOCUMENTS

| | | |
|---|---|---|
| 7,881,066 B2 | 2/2011 | Scheungraber et al. |
| 2006/0220816 A1 | 10/2006 | Scheungraber et al. |
| 2009/0151829 A1* | 6/2009 | Lionetti .............. B60C 23/0493 152/152.1 |
| 2010/0281968 A1* | 11/2010 | Kubota .................. B60C 13/00 73/146 |
| 2014/0261944 A1 | 9/2014 | Papakonstantopoulos et al. |
| 2018/0257437 A1* | 9/2018 | Hatanaka ................ B60C 11/03 |

FOREIGN PATENT DOCUMENTS

| | | |
|---|---|---|
| DE | 102007008043 A1 | 8/2008 |
| DE | 102007030231 A1 | 1/2009 |
| EP | 1970222 A1 | 9/2008 |
| EP | 2777958 A1 | 9/2014 |
| JP | 2007-331293 A | 12/2007 |
| JP | 2007326536 A | 12/2007 |
| JP | 2007331292 A | 12/2007 |
| JP | 4298922 B2 | 7/2009 |
| WO | WO-2008143326 A1 | 11/2008 |

OTHER PUBLICATIONS

Search Report for European application No. 166176272.9, dated Jan. 25, 2017.
Office Action received in corresponding Korean Application No. 10-2015-0118988, dated Sep. 7, 2016.
Japanese Office Action issued in Japanese Application No. 2016-111925, dated Jun. 20, 2017.

* cited by examiner

PNEUMATIC TIRE COMPRISING SENSOR PATCH AND METHOD FOR MANUFACTURING THE SAME

CROSS-REFERENCE TO RELATED APPLICATIONS

This U.S. patent application claims the benefit of priority under 35 U.S.C. § 119 of Korean Patent Application No. 10-2015-0118988, filed Aug. 24, 2015, the entire content of which is hereby incorporated herein by reference for all purposes.

TECHNOLOGICAL FIELD

The present description relates to a pneumatic tire equipped with a sensor patch and a method for manufacturing the same, and more particularly, to a pneumatic tire equipped with a sensor patch with a sensor groove in which a sensor can be bound to the inner side of a tire, and a method for manufacturing the pneumatic tire.

BACKGROUND

The condition of a tire is directly related to the safety of vehicle passengers, and usually, the timing for replacement and the condition of a tire are determined based on the abrasion state of the tread formed on the tire.

However, although the abrasion state of the tread may serve as an indicator showing the condition of a tire, the tread abrasion state is somewhat insufficient as information indicating the general condition of a tire. There is a variety of information that should be monitored for the vehicle safety, such as the air pressure inside the tire, temperature, speed of rotation, and pressure, as well as the angle formed by the tire and the axis during driving, and these information pieces need to be collected and understood in real time for the safety of passengers.

Accordingly, there have been attempts to mount sensors on the tires for motor vehicles and aircraft; however, it is not easy to install a sensor inside a tire that rotates at a high speed, and there has been a problem that an installed sensor is easily detached due to the friction heat and vibration generated when the tire rotates. In some aircraft tires, it was attempted to solve this problem by disposing a thin RFID sensor between the outer circumference and the inner liner of a tire; however, it was not easy to insert a sensor in the middle of vulcanization of the tire, and there was a risk of the sensor being damaged due to exposure to a high temperature.

In this regard, Japanese Patent Application Laid-Open (JP-A) No. 2000-168321 suggested "a method for preparing a pneumatic tire for binding an electronic monitor device", by which separation of a sensor from an inner liner of a tire is prevented by vulcanizing a patch into the inner liner and inserting a sensor therein. However, in JP-A No. 2000-168321, the patch is formed to have a large thickness, so that the pressure of the bladder may be exerted locally non-uniformly on the inner liner during the vulcanization process, and in this case, there is a risk that uneven wear may occur in the tire. Furthermore, there is a possibility that the space for inserting the sensor may be formed to be excessively large so that the sensor may be shaken therein, and this means that the sensor may be detached and removed. Furthermore, the sensor is attached to the bead side so that the sensor may be damaged at the time of installing or uninstalling the tire, and the sensor patch is composed of various parts such as a cover, an unvulcanized rubber layer and paper and has a complicated structure. Also, since heat transfer is not easily achieved so that vulcanization may take a long time, or the temperature may increase high, causing deterioration of the energy efficiency.

SUMMARY OF THE DESCRIPTION

An object of the presently described embodiments is to provide a pneumatic tire equipped with a sensor patch that is integrated into the inner liner without damaging the inner liner, and accommodates a detachable sensor module therein, and a method for manufacturing the pneumatic tire.

Another object is to provide a pneumatic tire equipped with a sensor patch which prevents the pressure of the bladder from being exerted locally non-uniformly when the sensor patch is vulcanized into the inner liner, and can thereby enhance the product quality of the tire, and a method for manufacturing the pneumatic tire.

In order to achieve the objects described above, a tire equipped with a sensor patch according to one aspect of the present embodiments includes a sensor module and a sensor patch. The sensor module collects data that is transferred into the interior of a tire. The sensor patch has two edges formed integrally with the inner liner, and a sensor hole is formed between the two edges. Also, an accommodation space that accommodates the sensor module is formed between the sensor hole and the inner liner. The sensor hole is expanded when the sensor module is inserted, and is restored after the sensor module has been inserted.

A tire equipped with the sensor patch according to an embodiment includes a sensor module and a sensor patch. The sensor module collects the data transferred to the tire. The sensor patch is formed integrally with the inner liner and is bound to the inner circumferential surface of the inner liner. The sensor patch includes, in a certain region, a sensor groove that accommodates the sensor module. The sensor groove is expanded when the sensor module is inserted, and is restored after the sensor module has been inserted.

Here, the sensor groove may have at least one or more shoulders formed along the direction of insertion of the sensor module.

Here, the sensor module may be inserted into the accommodation space along the plane direction of the inner liner and fixed to the sensor hole.

Here, the sensor patch may be formed to have a thickness equivalent to 20% to 120% of the thickness of the inner liner.

Here, the sensor module may be fixed to the sensor hole using an adhesive.

Here, the sensor module may be fixed to the sensor groove using an adhesive.

Here, at least one or more sensor patches may be disposed on the inner circumferential surface of the inner liner.

Here, plural sensor patches are disposed at an equal interval along the circumferential direction of the inner circumferential surface, and the angle between the respective sensor patches may be formed to be 5° to 180°.

Here, the sensor patch may be formed as a linear patch or as a combination of at least two or more linear patches disposed crosswise on the bottom surface adjoining the inner liner, and thus the adhesion state of the sensor module can be maintained thereby.

Here, regarding the linear patch, when at least two or more linear patches are formed crosswise, the intersecting zone may be formed integrally.

Here, the sensor patch may be formed from any one of the same material as that of the inner liner, natural rubber, a synthetic rubber, a polymer and natural rubber, and mixtures of the materials described above.

Here, the planar shape of the sensor patch may be formed into any one of a circular shape, an elliptical shape, and a polygonal shape.

Here, with regard to the sensor patch, the inner walls of the sensor accommodation space being adsorbed to each other by the internal space-forming film provided in the accommodation space at the time of vulcanization can be prevented, and after completion of vulcanization, the internal space-forming film is removed to allow a sensor module to be inserted into the sensor groove.

Here, the internal space-forming film may include an injector that is protruded in the reverse direction of the sensor groove in order to be separated from the sensor groove.

Here, a sensor protective film may be formed from a heat-resistant polymer material which does not melt at the vulcanization temperature.

A method for manufacturing a pneumatic tire equipped with a sensor patch according to another aspect of the present embodiments includes:

a sensor patch vulcanization step of preparing a sensor patch including an internal space-forming film, and vulcanizing at least one or more sensor patches on the inner circumferential surface of the inner liner of a tire, with two edges of each sensor patch being vulcanized; and an accommodation space forming step of removing the internal space-forming film from the sensor patches and thereby forming accommodation spaces.

Here, after the internal space forming step has been completed, the method may further include a sensor module insertion step of applying an adhesive for temporary fixation or permanent fixation on a sensor module or the accommodation space, and inserting the sensor module into the accommodation space.

The pneumatic tire equipped with a sensor patch according to the present invention can have a sensor patch firmly bound to the tire by integrally binding the sensor patch to the inner liner, without damaging the inner liner, and allows easy and convenient replacement of a sensor module.

The method for manufacturing a pneumatic tire equipped with a sensor patch can prevent the pressure of the bladder from being exerted locally non-uniformly when a sensor patch is vulcanized into the inner liner, by forming the thickness of the sensor patch to be smaller than the thickness of the inner liner, and can thereby enhance the product quality of the tire.

DETAILED DESCRIPTION

Figure 1:
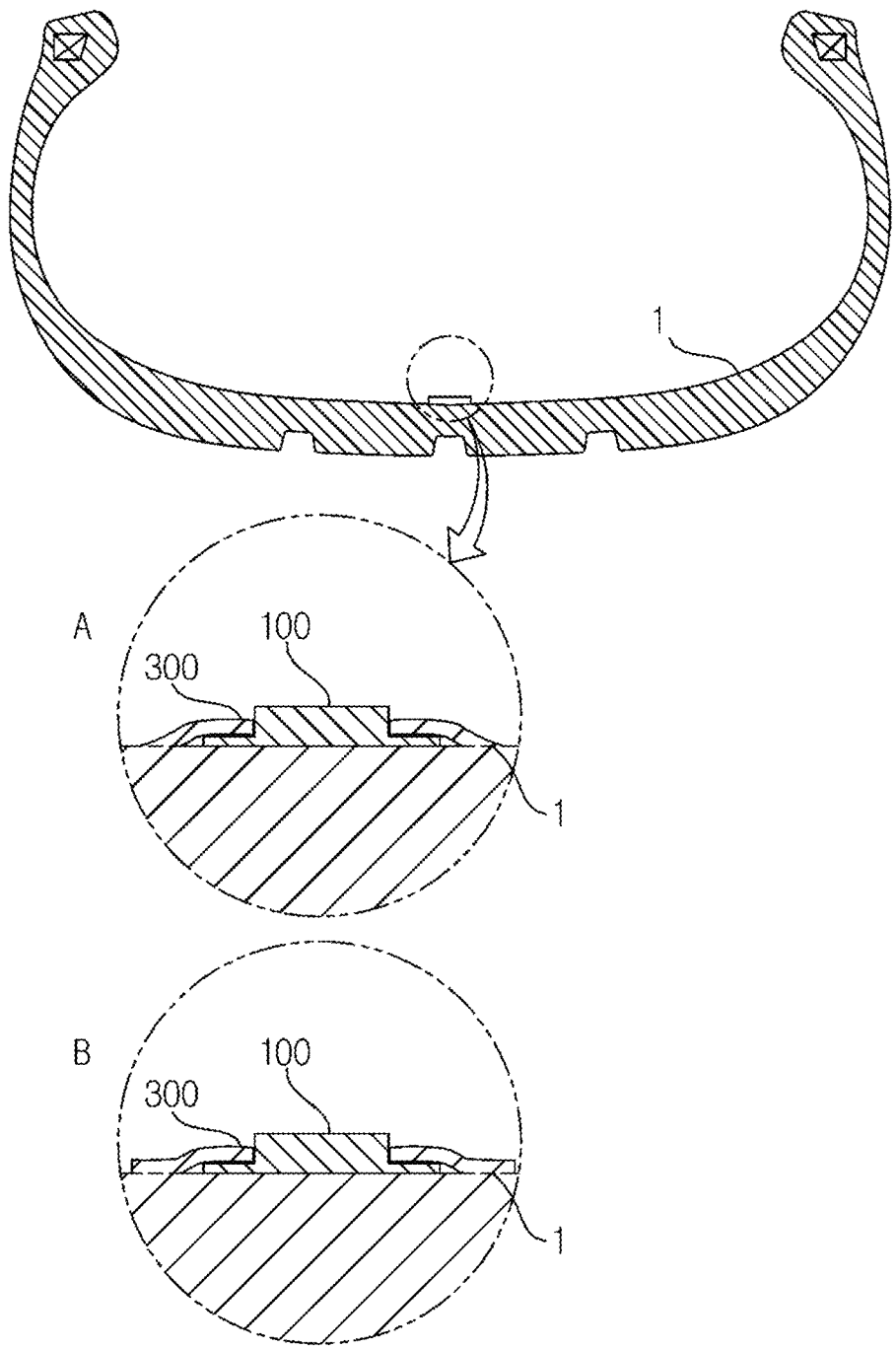
FIG. 1 is a cross-sectional diagram of a tire equipped with a sensor patch according to an embodiment.

Hereinafter, preferred embodiments will be described in detail with reference to the attached drawings. At this time, it should be noted that identical constituent elements illustrated in the attached drawings are assigned with the same reference numeral as far as possible. Also, any detailed explanations on known functions and configurations that may make the gist of the present invention ambiguous will be omitted. Similarly, some constituent elements are exaggerated, omitted, or schematically illustrated in the attached drawings.

Furthermore, throughout the specification, when it is said that a certain part "includes" a certain constituent element, unless particularly stated otherwise, this implies that other constituent elements are not to be excluded, but other constituent elements may be further included. Furthermore, the phrase "on the . . . " as used throughout the specification means that the relevant element is positioned above or below an intended object, and it does not necessarily mean that the relevant element is positioned on the upper side with respect to the direction of gravity.

A green tire as used in the present specification means an unvulcanized tire in a state before being vulcanized using a bladder.

Figure 2:
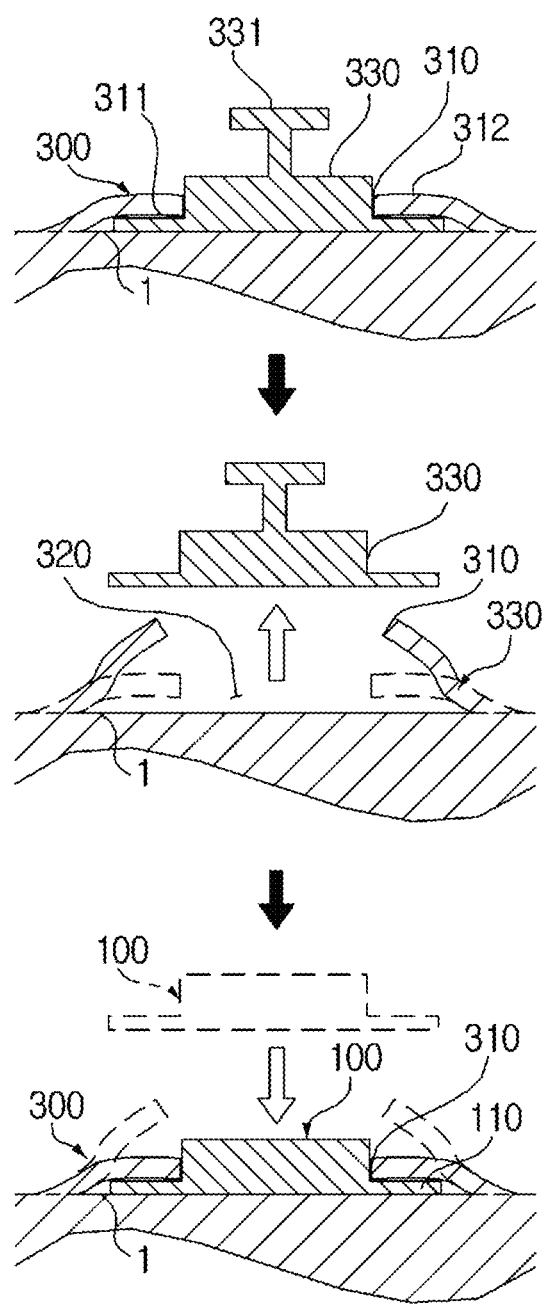
FIG. 2 is a flow diagram illustrating the state in which an internal space-forming film is removed from the sensor patch, and a sensor module is inserted into the internal space.
Figure 3A:
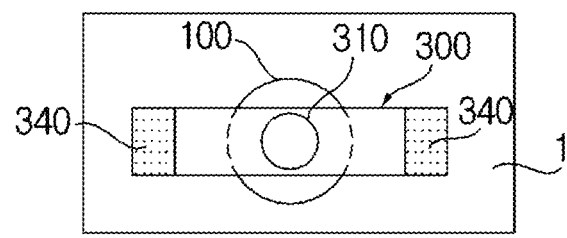
FIG. 3a-FIG. 3e are plan view diagrams illustrating various planar shapes of the sensor patch according to embodiments.
Figure 3B:
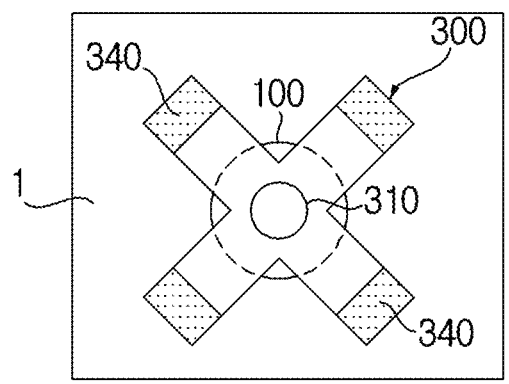
Figure 3C:
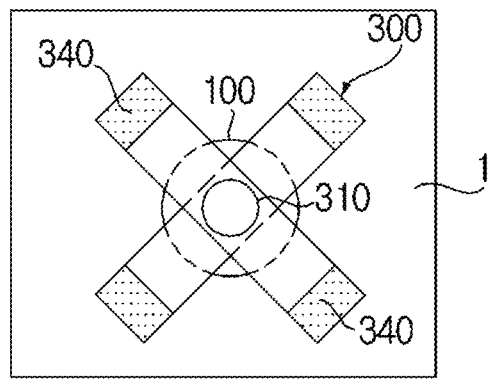
Figure 3D:
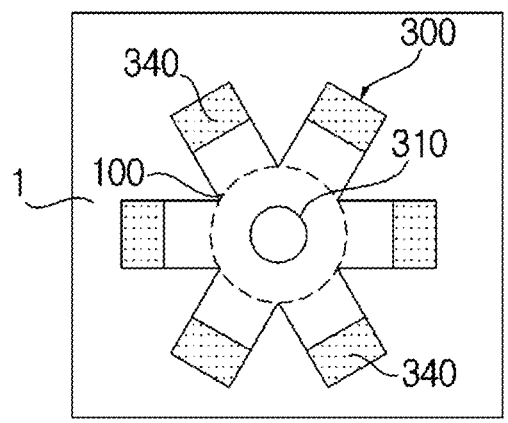
Figure 3E:
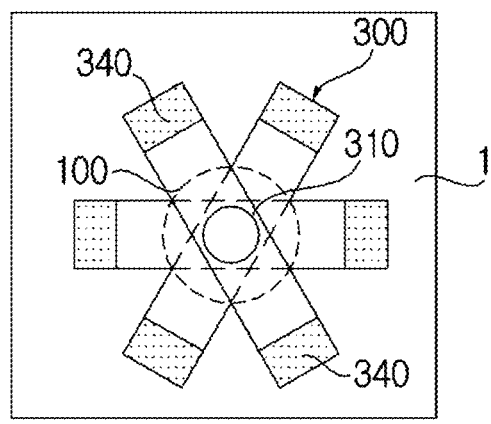

FIG. 1 is a cross-sectional view diagram of a tire equipped with a sensor patch according to an embodiment. FIG. 2 is a cross-sectional view diagram illustrating a state in which an internal space-forming film is removed from the sensor patch according to an embodiment, and a sensor module is inserted into the internal space. FIG. 3a-FIG. 3e are plan view diagrams illustrating various planar shapes of the sensor patch according to embodiments.

With reference to FIG. 1 to FIG. 3, a tire equipped with a sensor patch according to an embodiment includes a sensor module (100) and a sensor patch (300).

The sensor module (100) is used to collect data that are transferred into the interior of a tire (10) when a vehicle runs, and to provide various information pieces such as the condition of the road surface, the extent of tire abrasion, temperature of the tire, and the state of uneven wear of the tire, to the driver in real time. A vehicle may be equipped with a data reception unit (not illustrated in the diagram) for receiving the data collected by the sensor module (100), and an electronic control unit of the vehicle may analyze the received data and provide warning signs to the driver.

The sensor module (100) is disposed in an accommodation space (320) formed between the inner liner (1) of a tire and a sensor hole (310) formed in a region of the sensor patch (300). The outer diameter of the sensor module (100) is formed to be larger than the diameter of the sensor hole (310), and thus, escaping of the sensor module (100) to the outside can be prevented.

Here, an adhesive may be applied on an exposed surface of the sensor module (100) or the accommodation space (320). Regarding the adhesive, an adhesive for temporary fixation having a weak adhesive power, and an adhesive for permanent fixation having a strong adhesive power can all be used. In a case in which the sensor module (100) is temporarily fixed to the accommodation space (320), it is not necessary for the adhesive to have a strong adhesive power. On the contrary, in a case in which the sensor module (100) should be strongly fixed to the accommodation space (320), an adhesive having a strong adhesive power may be applied to firmly fix the sensor module (100).

The sensor patch (300) is formed integrally with the inner liner (1) by having its two edges (340) vulcanized into the inner circumferential surface of the inner liner (1). That is, as the sensor patch (300) is physically attached to the inner liner (1) and vulcanized in order to integrate the sensor patch (300) with the inner liner (1), the inner liner (1) and the sensor patch (300) can be thermochemically integrated.

At this time, the sensor patch (300) can be bound to the inner liner (1) without any level difference (FIG. 1(A)), or can be bound with a level difference formed therebetween, while two edges of the sensor patch (300) are integrated with the inner liner (1), but the binding surface of the sensor patch (300) and the inner liner (1) is not limited to this.

The sensor patch (300) may have a sensor hole (310) formed between the two edges (340), and preferably at the center. The sensor module (100) is disposed in the accommodation space (320) formed between the sensor hole (310) and the inner liner (1), and protrusions of the sensor module (100) are fixed to the sensor hole (310) so that a strong binding force can be retained.

The sensor hole (310) is expanded when the sensor module (100) is inserted, thus accommodating the sensor module (100) therein, and is thereafter restored to hold the sensor module (100). That is, the diameter of the sensor hole (310) is formed to be larger than the maximum outer diameter (110) of the sensor module (100), so that the sensor hole (310) can prevent escaping of the sensor module (100).

Furthermore, the sensor module (100) can be inserted into the accommodation space (320) along the plane direction of the inner liner (1). As such, when the sensor module (100) is inserted into the accommodation space (320) along the plane direction of the inner liner (1), a separate process for expanding the sensor hole (310) can be omitted, and the sensor module (100) can be conveniently fixed.

The sensor patch (300) may be formed from the same material as the material of the inner liner (1), or from any one among natural rubber, a synthetic rubber, a polymer, and a mixture of the natural rubber, a synthetic rubber and a polymer mentioned above. That is, the material for the sensor patch (300) is not limited as long as it is a material that can be integrally formed with the inner liner (1) at the time of the vulcanization process for the tire.

It is preferable that the thickness of the sensor patch (300) is equivalent to 20% to 120% of the thickness of the inner liner (1). Since the thickness of the inner liner (1) for a 16-inch tire for passenger cars is generally 1.5 mm, the thickness of the sensor patch (300) may be adjusted to 0.3 mm to 1.8 mm. When the thickness of the sensor patch (300) is adjusted to the set range, at the time of vulcanizing a green tire, the sensor patch (300) locally exerting pressure to the inner circumferential surface of the inner liner (1) can be prevented. Therefore, the product quality of the tire is enhanced, the occurrence of uneven wear of the tire is reduced, and insertion of the sensor module is facilitated.

If the sensor patch (300) is formed to have a thickness less than 0.3 mm, at the time of vulcanizing a green tire, the sensor patch (300) locally exerting pressure to the inner circumferential surface of the inner liner (1) can be prevented; however, the thickness of the sensor patch (300) is so thin that the patch is damaged when the sensor module (100) is inserted, and there is a problem that it is difficult to insert the sensor module (100). Furthermore, if the sensor patch (300) is formed to have a thickness larger than the set thickness, it is effective to protect the sensor module (100). However, at the time of vulcanizing a green tire, the thickness of the sensor patch (300) causes localized exertion of pressure to the inner liner (1), the product quality of the tire is deteriorated, and there may be a problem of causing uneven wear in the tire.

The internal space-forming film (330) is disposed between the sensor hole (310) and the inner liner (1). Therefore, at the time of vulcanizing a green tire, the internal space-forming film (330) of the sensor hole (310) can be prevented from closely adhering to the inner liner (1).

The internal space-forming film (330) is preferably formed from a heat-resistant polymer material which can melt at a temperature higher than the melting point of the sensor patch (300). Thereby, the sensor patch (300) is first integrated with the inner liner (1) at the time of vulcanization, and thus the sensor patch (300) can be prevented from closely adhering to the adjoining inner liner (1). The thickness of the internal space-forming film (330) is preferably equivalent to 20% to 50% of the thickness of the sensor patch. If the thickness of the internal space-forming film (330) is less than 20% of the thickness of the sensor patch, the adhesion preventive effect may become negligible. If the thickness of the internal space-forming film (330) is more than 50% of the thickness of the sensor patch, localized imbalance of pressure may occur at the time of vulcanization.

The internal space-forming film (330) is removed after the sensor patch (300) is integrated with the inner liner (1), by expanding the sensor hole (310) or removing the film along the plane direction of the inner liner (1), and thus the accommodation space (320) can be formed. The internal space-forming film (330) may further include an ejector (331). When the ejector (331) is held and an external force is applied in the upward direction, the internal space-forming film (330) can be separated from the sensor groove (210).

The sensor patch (300) is formed as a linear patch on the bottom surface adjoining the inner liner (1), or at least two or more linear patches may be disposed crosswise. As such, when sensor patches (300) are disposed crosswise, the sensor module (100) can be fixed to adhere firmly to the inner liner (1). In the present embodiment, an example in which the sensor patches (300) are disposed in the form of "X" or in the form of "*" is described; however, the shape is not intended to be limited to these.

Furthermore, when the sensor patches (300) are disposed to intersect each other, the intersection zone is formed integrally as shown in FIG. 8(*b*) and FIG. 8(*d*), so as to decrease the thickness of the intersecting part. Thus, the weight of the tire is reduced, the fuel consumption ratio is increased, and localized exertion of pressure to the inner liner (1) at the time of vulcanization of the sensor patch (300) can be prevented.

Figure 4A:
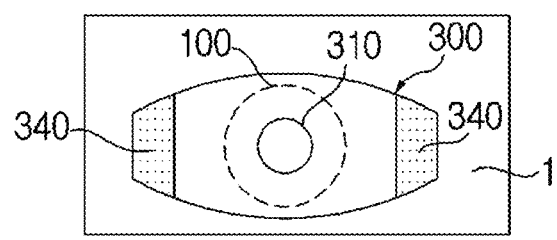
FIG. 4a and FIG. 4b are plan view diagrams illustrating planar shapes according to Modification Examples of the sensor patch according to embodiments.
Figure 4B:
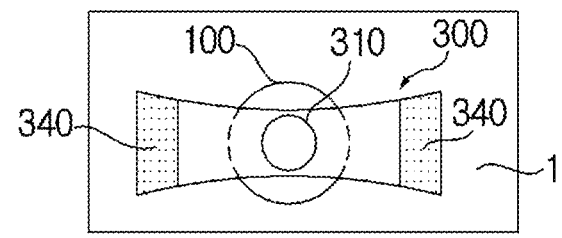
Figure 5A:
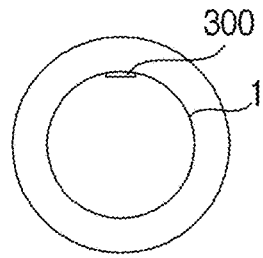
FIG. 5a to FIG. 5d are lateral view diagrams of the mode in which sensor patches are vulcanized and bound along the outer circumferential surface of the inner liner according to embodiments.
Figure 5B:
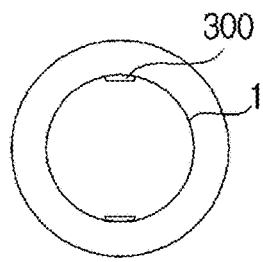
Figure 5C:
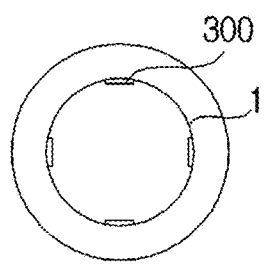
Figure 5D:
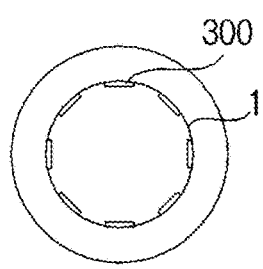

FIG. 4a and FIG. 4b are plan view diagrams illustrating the planar shapes according to Modification Examples of the sensor patch according to the embodiment.

The sensor patch (300) can be formed into a planar shape that is convex (FIG. 4a) or concave (FIG. 4b), at the center of the sensor hole (310). Furthermore, the sensor patch (300) formed as such may be formed crosswise in the form of "X" or in the form of "*", as illustrated in FIG. 3a-FIG. 3e, and the shape is not intended to be limited to these.

FIG. 5a-FIG. 5e are lateral view diagrams of the mode in which the sensor patches according to the embodiment of the present invention are vulcanized and bound along the outer circumferential surface of the inner liner.

As illustrated in FIG. 5a-FIG. 5e, one sensor patch (300) may be fixed and bound to the inner circumferential surface of the inner liner, in consideration of the tire balance. Furthermore, several sensor patches (300) may be disposed on the inner liner (1) at an equal interval around the tire axis. The sensor patches (300) disposed at an equal interval can make the balance of the tire and the pressure exerted to the tire more uniform.

At this time, the equal interval may be any equal interval disposed at an angle selected from 5° to 180°. That is, in a case in which the sensor patches (300) are disposed at an angle of 180°, two sensor patches (300) may be provided on the inner circumferential surface of the inner liner (1), and in a case in which the sensor patches (300) are disposed at an angle of 90°, four sensor patches (300) may be provided on the inner liner (1). That is, the disposition interval of the sensor patches (300) can be applied in various manners, in consideration of the size of the tire or the kind of the tire.

Figure 6:
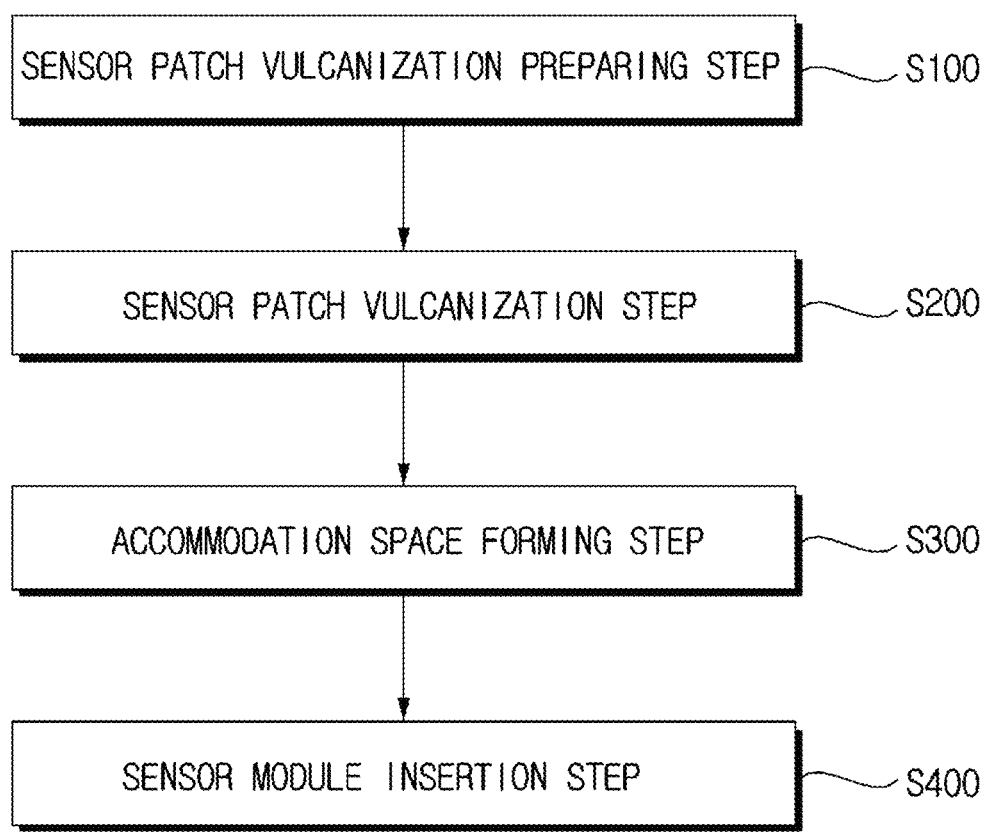
FIG. 6 is a production flow diagram for a tire equipped with a sensor patch according to the embodiments.

FIG. 6 is a production flow diagram for the tire equipped with a sensor patch according to the embodiment of the present invention. The production procedure will be explained with reference to FIG. 1 and FIG. 2.

As illustrated in FIG. 6, the method for manufacturing a pneumatic tire equipped with a sensor patch according to the embodiment of the present invention includes a sensor patch vulcanization preparing step (S100), a sensor patch vulcanization step (S200), and an accommodation space forming step (S300).

Vulcanization of the sensor patch (300) is prepared by inserting an internal space-forming film (320) into the sensor hole (310) formed in a region, so that two edges (340) of the sensor patch (300) are integrated into the inner circumferential surface of the inner liner (1) of a green tire (S100). At this time, at least one or more sensor patches (300) can be bound along the outer circumferential surface of the inner liner (1), and the sensor patches can be disposed at an equal interval selected from any angle between 5° to 180°, so as to maintain the balance of the tire.

Two edges (340) of the sensor patch are vulcanized into the inner circumferential surface of the inner liner (1), and thus the two edges (340) of the sensor patch (300) are integrated (S200). At this time, an internal space-forming film (330) is disposed between the sensor patch (300) and the inner liner (1) in order to prevent the sensor patch (300) and the inner liner (1) from closely adhering to each other, and the internal space-forming film (330) is removed after vulcanization to thereby form an accommodation space (320) (S300).

The method may further include a step of inserting a sensor module (100) into the accommodation space (320) (S400). The sensor module (100) may be inserted before shipping or after shipping of the tire in which the accommodation space (320) has been formed. That is, the sensor module (100) can be inserted by expanding the sensor hole (310) of the sensor patch (300) and making the sensor hole (310) larger than the diameter of the sensor module (100). When insertion of the sensor module (100) is completed, the expanded sensor hole (310) is restored due to resilience, and the sensor module (100) can be firmly fixed. Furthermore, the sensor module (100) may also be inserted into the accommodation space (320) along the plane direction of the inner liner (1).

The method may further include a sensor module adhesive adhesion step of applying an adhesive to the sensor module (100) and attaching the sensor module (100). The adhesive can fix the sensor module (100) more strongly, and can thereby prevent detachment of the sensor module. Regarding the adhesive, an adhesive for temporary fixation or an adhesive for permanent fixation can be used.

Figure 7:
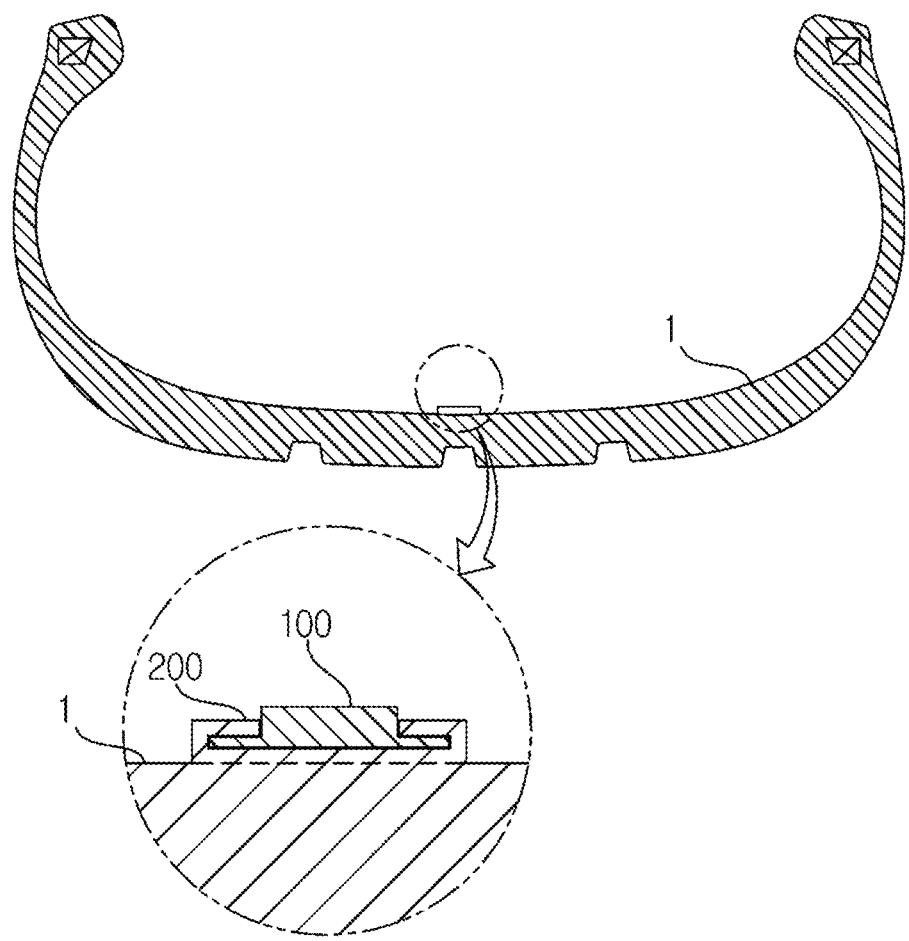
FIG. 7 is a cross-sectional view diagram of a tire equipped with a sensor patch according to another embodiment.
Figure 8A:
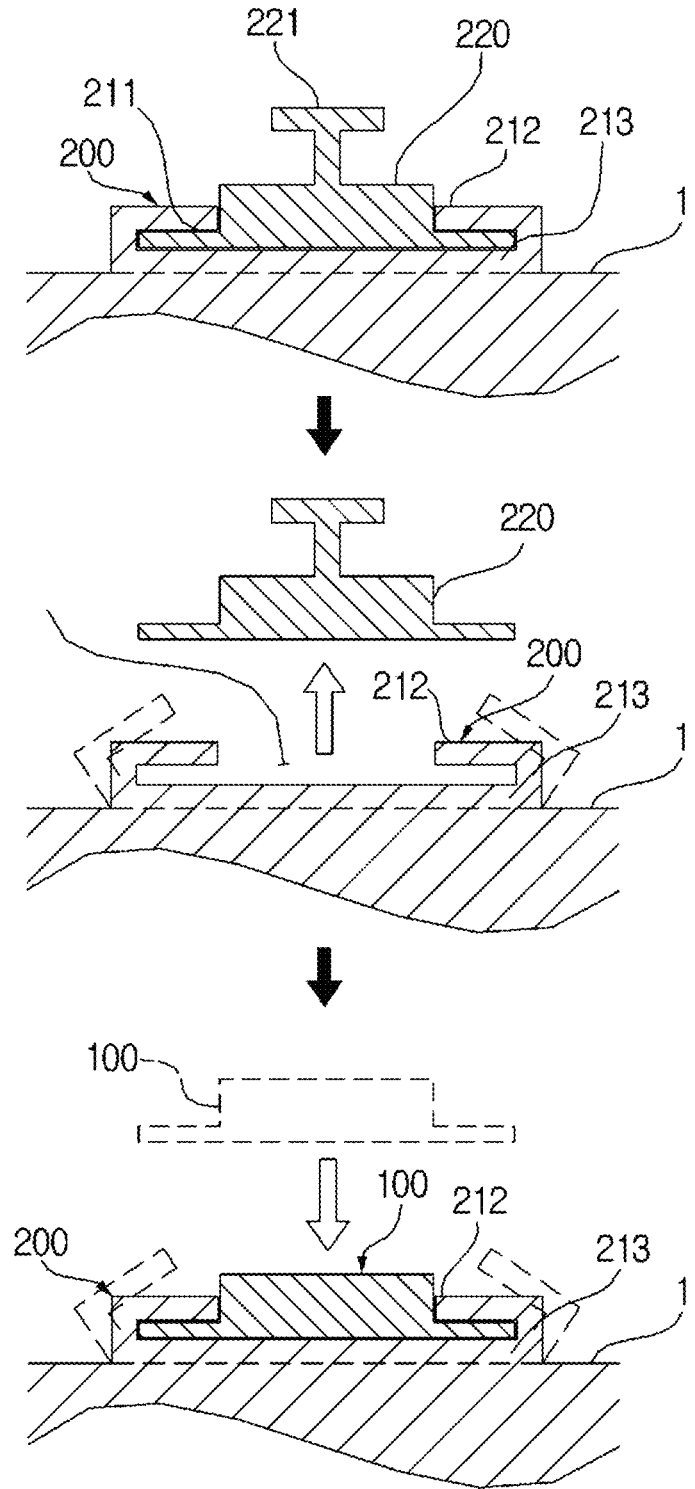
FIG. 8a is a cross-sectional view diagram illustrating the state in which an internal space-forming film is removed from the sensor patch according to another embodiment, and a sensor module is inserted into the internal space.
Figure 8B:
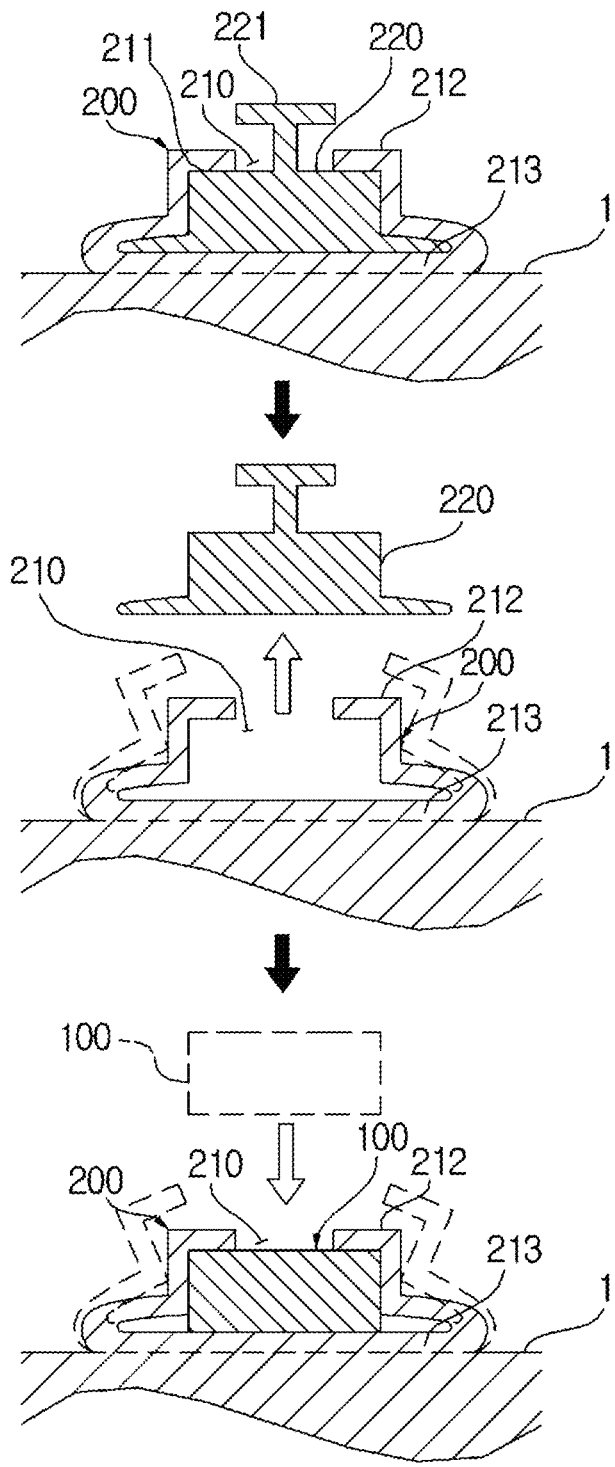
FIG. 8b is a cross-sectional view diagram illustrating the state in which an internal space-forming film according to a modification of a sensor patch according to another embodiment, and a sensor module is inserted into the internal space.

FIG. 7 is a cross-sectional view diagram of a tire equipped with a sensor patch according to another embodiment of the present invention. FIG. 8a is a cross-sectional view diagram illustrating the state in which the internal space-forming film is removed from the sensor patch according to another embodiment of the present invention, and a sensor module is inserted. FIG. 8b is a cross-sectional view diagram illustrating the state in which the internal space-forming film according to a modification of the sensor patch according to another embodiment of the present invention is removed, and a sensor module is inserted.

As illustrated in FIG. 7 and FIG. 8, a tire equipped with a sensor patch according to another embodiment includes a sensor module (100) and a sensor patch (200). Here, since the functional characteristics of the sensor module (100) are the same as described above, the details will not be repeated here.

The sensor module (100) is disposed to be inserted into a sensor groove (210) formed in a region of the sensor patch (200). The sensor module (100) can be prevented from escaping to the outside, by the shoulders (211) formed in the sensor patch (200). Furthermore, the sensor module (100) can be attached more strongly to the sensor patch (200) when an adhesive is applied on the surface that is brought into contact with the sensor patch (200). The adhesive may be applied on the sensor module (100) or inside the sensor groove (210), and an adhesive having a strong adhesive power and an adhesive having a weak adhesive power can all be used. The details are the same as described above and will not be repeated here.

The sensor patch (200) is formed to be integrally bound to the inner liner (1) by being vulcanized into the inner circumferential surface of the inner liner (1), and may have a sensor groove (210) formed in a region of the sensor patch (200). The lower surface (213) of the sensor patch (200) can be formed to be wider than the upper surface (212), and this is because when the sensor module (100) is inserted into the sensor groove (210), although it is difficult to insert the sensor module (100) into the sensor patch (200), the sensor module (100) does not easily escape from the sensor patch (200) after being inserted.

That is, the width on the opening side of the sensor groove (210) is formed to be narrower than the width on the edge side of the internal space-forming film (220). The sensor groove (210) is expanded when the sensor module (100) is inserted, and after the sensor module (100) has been inserted, the sensor groove (210) is restored to the original size and can firmly fix the sensor module (100). Preferably, the sensor patch (200) may be formed from the same material as the material of the inner liner (1), or any one of natural rubber, a synthetic rubber, a polymer, and a mixture of the natural rubber, synthetic rubber and polymer mentioned above. Furthermore, the sensor patch may be formed from latex having excellent restoring power. That is, the material for the sensor patch (200) is not limited as long as it is a material which can be formed integrally with the inner liner (1) at the time of the vulcanization process for a tire.

The sensor patch (200) can have at least one or more shoulders (211) along the direction of insertion of the sensor module (100). That is, the internal space of the sensor patch (200) is formed in the form of "凸", a concave shape, or a linear shape extended in one direction, and a shoulder (211) can be formed along the inner circumferential surface of the sensor groove (210).

The shoulder (211) can prevent escaping of the sensor module (100) by fixing the sensor module (100) in a state in which the sensor module (100) is inserted. Therefore, the shoulder (211) and the sensor module (100) can maintain a strong binding force, and when the shoulder (211) and the sensor module (100) maintain a strong binding force, the sensor module (100) being separated from the sensor groove (210) can be prevented even if the tire rotates at a high speed. The embodiment of the present invention is illustrated such that one shoulder (211) is formed; however, plural shoulders (211) can be formed. Here, the characteristics based on the material and thickness of the sensor patch (200) are the same as described above, and therefore, the details will not be repeated here.

The internal space-forming film (220) is inserted by expanding the sensor groove (210), and is disposed between the upper surface (212) and the lower surface (213) of the sensor patch (200). Therefore, at the time of vulcanizing a green tire, the internal space-forming film (220) can prevent the upper surface (212) and the lower surface (213) of the sensor patch (200) from closely adhering to each other. At this time, when the internal space-forming film (220) is removed by expanding the sensor groove (210) of the sensor patch (200) that has been integrated with the inner liner (1), the sensor module (100) can be fixed in the sensor groove (210).

The internal space-forming film (220) is formed from a heat-resistant polymer material which melts at a temperature higher than the melting point of the sensor patch (200), and thus the internal space-forming film (220) can prevent close adhesion to the sensor patch (200).

The internal space-forming film (220) may include an ejector (221) on the exposed surface of the internal space-forming film (220) in order to be detached from the sensor groove (210). The details of the ejector (221) are the same as described above, and thus will not be repeated here.

Figure 9A:
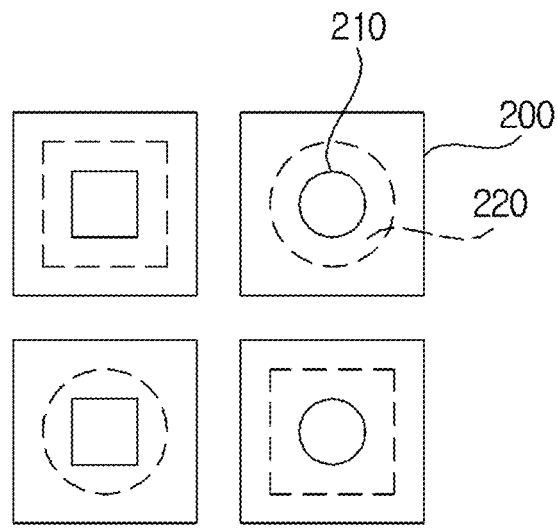
FIG. 9a and FIG. 9b are plan view diagrams illustrating various planar shapes of the sensor patch according to another embodiment.
Figure 9B:
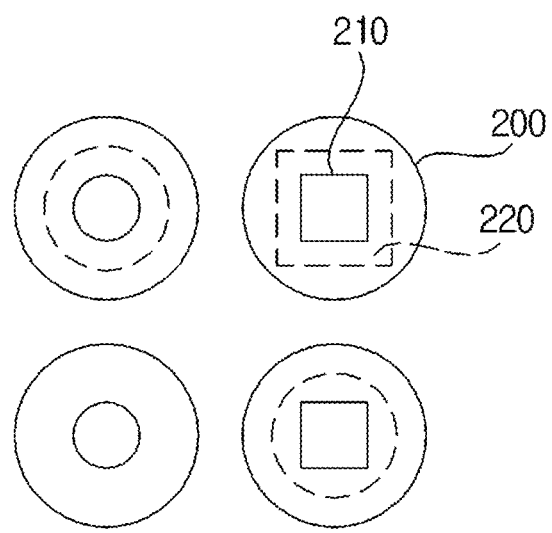
Figure 10:
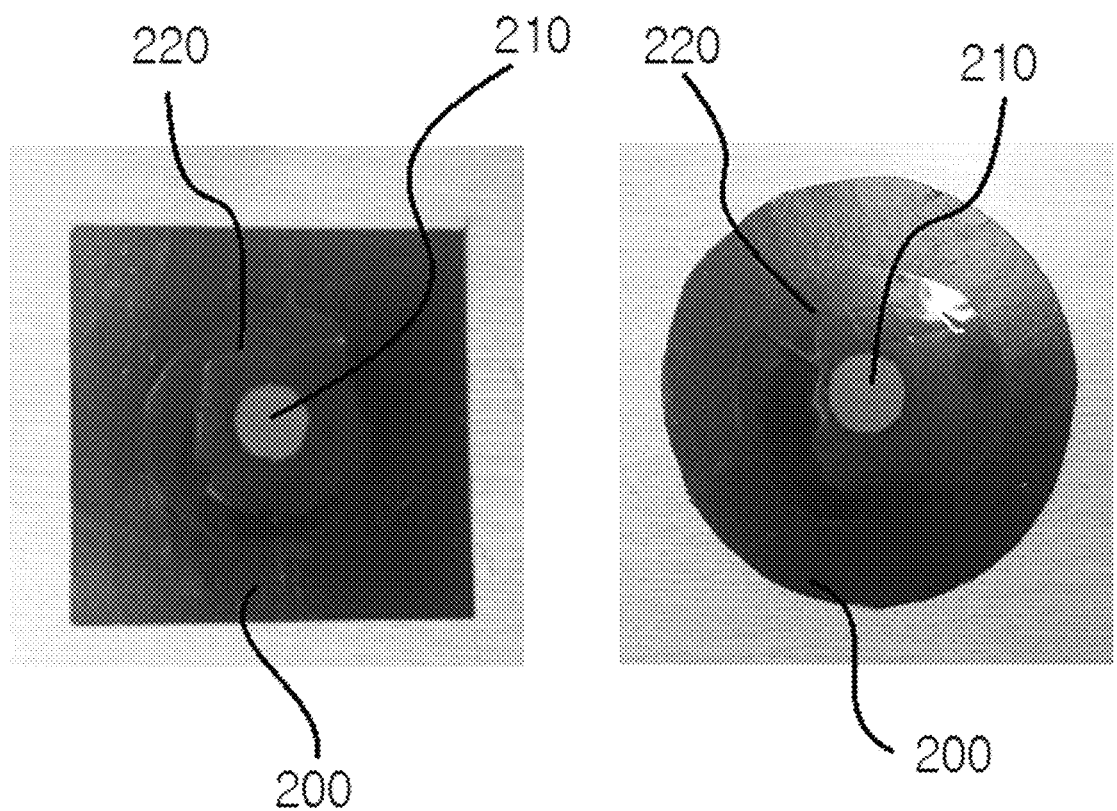
FIG. 10 is a set of photographs showing sensor patches according to another embodiment.

FIG. 9a and FIG. 9b are plan view diagrams illustrating various planar shapes of the sensor patch according to another embodiment of the present invention, and FIG. 10 is a set of photographs showing sensor patches according to another embodiment.

As illustrated in FIG. 9a, FIG. 9b, and FIG. 10, in the tire equipped with a sensor patch according to embodiments, various shapes of the sensor patch and various intervals of disposition of the sensor patches on the inner liner can be applied, and this will be explained with reference to FIG. 7 and FIG. 8.

The sensor patch (200) can be formed in a circular form, an elliptical form, or a polygonal form. In the embodiments of the present invention, the shape of the sensor patch (200) is explained to be a rectangular shape or a circular shape; however, various shapes can be applied, and it is preferable that the internal space-forming film (220) is formed to have the same shape as the shape of the sensor groove (210) included in the sensor patch (200).

The sensor patch (200) is such that one sensor patch (200) can be bound integrally to the inner circumferential surface of the inner liner, or can be disposed at an equal interval at any one angle selected from 5° to 180°, in consideration of the tire balance. The interval of disposition of the sensor patch (200) is the same as described above, and the details will not be repeated here.

Figure 11:
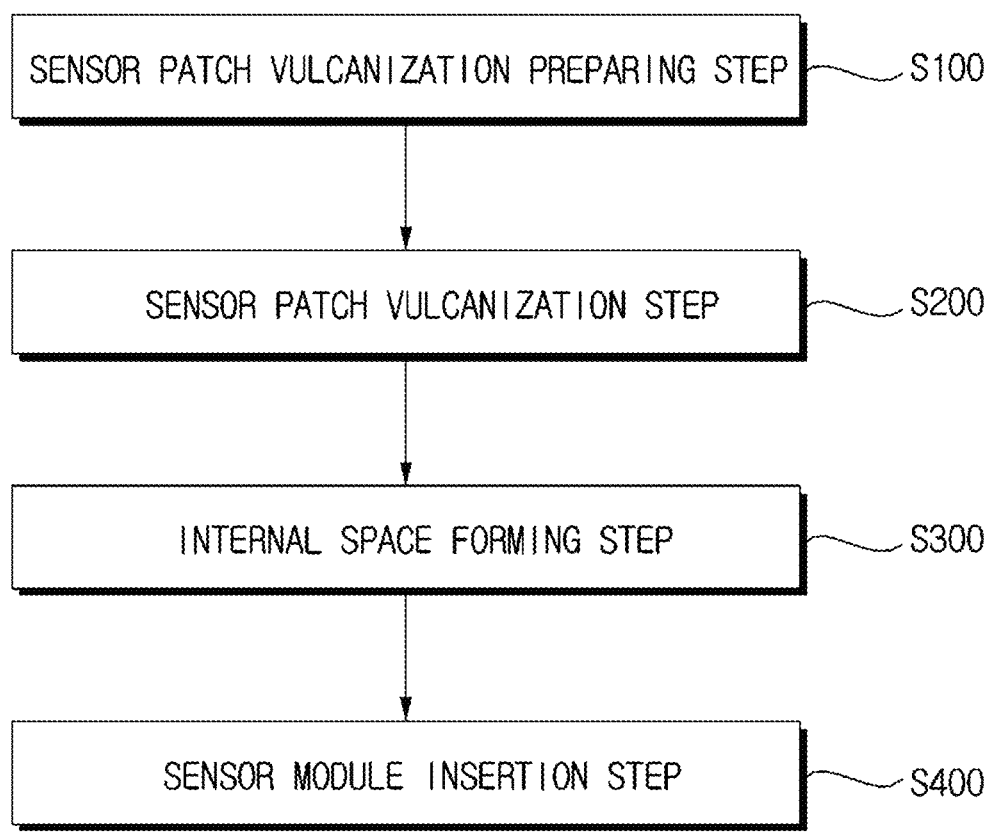
FIG. 11 is a production flow diagram for a tire equipped with a sensor patch according to another embodiment.

FIG. 11 is a production flow diagram for a tire equipped with a sensor patch according to another embodiment.

As illustrated in FIG. 11, the method for manufacturing a pneumatic tire equipped with a sensor patch according to another embodiment includes a sensor patch vulcanization preparing step (S100), a sensor patch vulcanization step (S200), and an internal space forming step (S300). The method will be explained with reference to FIG. 7 and FIG. 8.

The internal space-forming film (220) is inserted into the sensor groove (210) formed in one region of the sensor patch (200), and vulcanization of the sensor patch (200) into the inner circumferential surface of the inner liner (1) of a green tire is prepared (S100). At this time, at least one or more sensor patches (200) can be bound to the inner circumferential surface of the inner liner (1), and when plural sensor patches are bound, it is preferable that the sensor patches are disposed at an equal interval at any one angle selected from 5° to 180° so as to maintain the balance of the tire.

The sensor patch (200) thus prepared is vulcanized into the inner circumferential surface, and the inner liner (1) and the sensor patch (200) are integrated (S200). At this time, it is preferable that the thickness of the sensor patch (200) is formed to be equivalent to 20% to 120% of the thickness of the inner liner (1). The sensor patch set as such prevents the occurrence of non-uniform pressure at the time of vulcanization of a green tire, and thus the product quality of the tire can be enhanced. At this time, the internal space-forming film (220) prevents the walls of the sensor patch (200) from closely adhering to each other, and maintains the state in which the internal space-forming film (22) is disposed between the upper surface (212) an the lower surface (213) of the sensor patch (200). Thereafter, the internal space-forming film (220) is removed from the sensor patch (200), and an internal space is formed so as to form the sensor groove (210) (S300).

The method may further include a step of inserting the sensor module (100) into the sensor groove (210) (S400). In the sensor module insertion step (S400), the sensor module can be inserted before shipping or after shipping of the tire having the sensor groove (210) formed thereon, and thereby the sensor module can be inserted by the following method.

The sensor groove (210) is expanded, and the diameter of the sensor groove (210) is made larger than the diameter of the sensor module (100). While the diameter of the sensor groove (210) is made larger, the sensor module is inserted. After the insertion of the sensor module (100) is completed, the expanded sensor groove (210) is restored due to resilience, and the shoulder (211) formed in the sensor patch (200) can firmly fix the sensor module (100).

The method may further include a sensor module adhesive attachment step of applying an adhesive on the sensor module (100) and attaching the sensor module (100). The adhesive fixes the sensor module more strongly together with the shoulder (211), and can thereby prevent escaping of the sensor module. Regarding the adhesive, an adhesive for temporary fixation or an adhesive for permanent fixation can be used.

On the other hand, in regard to the embodiments and the like disclosed in the present specification and the drawings, particular embodiments have been suggested in order to explain the technical subject matter of the present invention more easily and to assist understanding, and are not intended to limit the scope of the present claims. It is obvious to those ordinarily skilled in the technical field to which the description is directed that in addition to the embodiments disclosed herein, other variations based on the technical idea of the present description can also be implemented.

What is claimed is:

1. A pneumatic tire equipped with a sensor patch, the pneumatic tire comprising:
    a sensor module for collecting data that are transferred to the interior of the tire; and
    a sensor patch having two edges formed integrally with an inner liner of the tire, with a sensor hole being formed between the two edges, an accommodation space that accommodating the sensor module being formed between the sensor hole and the inner liner, and at least two or more shoulders along the inner circumferential surface of the accommodation space to prevent the sensor module from escaping to the outside,
    wherein the sensor hole is expanded when the sensor module is inserted therein, and after the sensor module is inserted, the sensor hole is restored,
    wherein the sensor patch is formed as a combination of at least two or more linear patches disposed crosswise on the bottom surface adjoining the inner liner, and the sensor patch maintains the adhesion state of the sensor module,
    wherein in the sensor patch, the inner walls of the accommodation space are prevented from adhering to each other, by an internal space-forming film provided in the accommodation space at the time of vulcanization, and after completion of vulcanization, the internal space-forming film is removed, and the sensor module is inserted into the sensor hole, and
    wherein the internal space-forming film further includes an ejector that protrudes in the reverse direction of the sensor groove in order to separate the internal space-forming film from the sensor groove.

2. The pneumatic tire equipped with a sensor patch according to claim 1, wherein the sensor module is inserted into the accommodation space along the plane direction of the inner liner and is fixed to the sensor hole.

3. The pneumatic tire equipped with a sensor patch according to claim 1, wherein the sensor patch is formed to have a thickness equivalent to 20% to 120% of the thickness of the inner liner.

4. The pneumatic tire equipped with a sensor patch according to claim 1, wherein the sensor module is fixed within the sensor hole to the sensor patch with an adhesive.

5. The pneumatic tire equipped with a sensor patch according to claim 1, wherein at least one or more sensor patches are disposed on the inner circumferential surface of the inner liner.

6. The pneumatic tire equipped with a sensor patch according to claim 1, wherein plural sensor patches are disposed at an equal interval along the circumferential direction of the inner circumferential surface of the inner liner, and the angle between the respective patches is 5° to 180°.

7. The pneumatic tire equipped with a sensor patch according to claim 1, wherein the linear patch is formed such that when at least two or more linear patches are formed crosswise, the intersecting zone is formed integrally.

8. The pneumatic tire equipped with a sensor patch according to claim 1, wherein the sensor patch is formed from the same material as the material for the inner liner, natural rubber, a synthetic rubber, a polymer, or a mixture of the natural rubber, synthetic rubber and polymer described above.

9. The pneumatic tire equipped with a sensor patch according to claim 1, wherein the internal space-forming film is formed from a heat-resistant polymer material which does not melt at the vulcanization temperature.

* * * * *